United States Patent
Thomas et al.

(10) Patent No.: US 12,071,189 B2
(45) Date of Patent: Aug. 27, 2024

(54) METHOD OF VEHICLE ASSEMBLY INCLUDING MODULAR VEHICLE SUBASSEMBLY CONTROLS, COMMUNICATION AND MANUFACTURE

(71) Applicant: Ford Global Technologies, LLC, Dearborn, MI (US)

(72) Inventors: Galen Keith Thomas, Dearborn, MI (US); Kerry Lance Paskell, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 652 days.

(21) Appl. No.: 17/165,464

(22) Filed: Feb. 2, 2021

(65) Prior Publication Data

US 2021/0394844 A1    Dec. 23, 2021

Related U.S. Application Data

(63) Continuation-in-part of application No. 16/909,462, filed on Jun. 23, 2020, now Pat. No. 11,720,095.

(51) Int. Cl.
| | |
|---|---|
| *B62D 65/00* | (2006.01) |
| *B62D 65/04* | (2006.01) |
| *G01M 17/04* | (2006.01) |
| *G01M 17/06* | (2006.01) |

(52) U.S. Cl.
CPC ......... *B62D 65/005* (2013.01); *B62D 65/04* (2013.01); *G01M 17/04* (2013.01); *G01M 17/06* (2013.01)

(58) Field of Classification Search
CPC ..... B62D 65/005; B62D 65/04; G01M 17/04; G01M 17/06; G01M 17/007
See application file for complete search history.

(56) References Cited

U.S. PATENT DOCUMENTS

| | | | |
|---|---|---|---|
| 7,036,848 B2 | 5/2006 | Chernoff et al. | |
| 2004/0110472 A1* | 6/2004 | Witkowski | G07C 5/008 455/66.1 |
| 2012/0055725 A1* | 3/2012 | Mizoguchi | H01M 10/625 180/68.5 |
| 2015/0149545 A1* | 5/2015 | Kim | H04L 67/52 709/204 |
| 2016/0291578 A1* | 10/2016 | Walt, II | G05B 19/406 |
| 2018/0275681 A1 | 9/2018 | Gariepy et al. | |
| 2020/0140028 A1* | 5/2020 | Wells | B60L 53/12 |
| 2020/0142073 A1* | 5/2020 | Gassend | G01S 17/89 |
| 2022/0055701 A1* | 2/2022 | Faga | B62D 65/16 |
| 2022/0089237 A1* | 3/2022 | Sverdlov | B25J 9/1697 |

FOREIGN PATENT DOCUMENTS

CN    109625092    4/2019

* cited by examiner

*Primary Examiner* — Charles Cai

(74) *Attorney, Agent, or Firm* — Burris Law, PLLC

(57) ABSTRACT

A method of manufacturing a modular vehicle subassembly (MVS) includes assembling a propulsion system onto a vehicle frame, assembling a suspension system onto the vehicle frame, assembling a steering system and braking system onto the vehicle frame, assembling an electrical distribution system onto the vehicle frame, and integrating an onboard controller with the propulsion system, the steering system, and the braking system. The onboard controller is configured to command the propulsion system, the steering system, and the braking system such that the MVS is operable to move untethered through a top hat assembly line during assembly of a top hat on the MVS.

20 Claims, 6 Drawing Sheets

METHOD OF VEHICLE ASSEMBLY INCLUDING MODULAR VEHICLE SUBASSEMBLY CONTROLS, COMMUNICATION AND MANUFACTURE

CROSS-REFERENCE TO RELATED APPLICATIONS

This application claims the benefit of and is a continuation-in-part of U.S. patent application Ser. No. 16/909,462 filed on Jun. 23, 2020, which is commonly assigned with the present application. This application is also related to co-pending applications filed concurrently herewith titled "FLEXIBLE MODULAR PLATFORM", "FACILITY SENSORY SYSTEM FOR MONITORING, GUIDING, AND PROTECTING FLEXIBLE MODULAR PLATFORMS MOVING THROUGH AN ASSEMBLY LINE", "FLEXIBLE MODULAR PLATFORM PLANT NAVIGATION SYSTEM", and "METHOD OF STORING, PROCESSING, AND TRANSMITTING DIGITAL TWINS FOR FLEXIBLE MODULE PLATFORMS AND VEHICLES", which are commonly assigned with the present application. The contents of these patent applications are incorporated herein by reference in their entireties.

FIELD

The present disclosure relates to vehicles and manufacturing of vehicles.

BACKGROUND

The statements in this section merely provide background information related to the present disclosure and may not constitute prior art.

Vehicles are typically manufactured in assembly plants designed and built to support a projected vehicle assembly volume based on mechanical infrastructure requirements needed to support manufacturing operations. And such mechanical infrastructure requirements typically include conveyer systems and/or automatic guided vehicle (AGV) based systems to move vehicle subassemblies from station to station along an assembly line. However, the time, investment and capital expenditure needed to build conveyer systems or to adapt AGVs for specific application tasks can be prohibitive.

These issues associated with moving vehicle subassemblies along assembly lines in vehicle assembly plants, among other issues related to manufacturing different product configurations in the same assembly facility, are addressed by the present disclosure.

SUMMARY

This section provides a general summary of the disclosure and is not a comprehensive disclosure of its full scope or all of its features.

According to one form of the present disclosure, a method of manufacturing a modular vehicle subassembly (MVS) includes assembling a propulsion system onto a vehicle frame, assembling a suspension system onto the vehicle frame, assembling a steering system and braking system onto the vehicle frame, assembling an electrical distribution system onto the vehicle frame, and integrating an onboard controller with the propulsion system, the steering system, and the braking system. The onboard controller is configured to command the propulsion system, the steering system, and the braking system such that the MVS is operable to move untethered through a top hat assembly line during assembly of a top hat on the MVS.

In some variations, the onboard controller is a stand-alone unit with an onboard communications link, while in other variations the onboard controller is integrated within a computer cluster of the MVS. In at least one variation the method includes assembling an onboard communications link in communication with the onboard controller.

In some variations, the method includes testing at least one of the drive system, the suspension system, the steering system, the braking system and the propulsion system before integrating the onboard controller such that operation of at least one of the drive system, the suspension system, the steering system, the braking system and the propulsion system independent of the onboard controller is verified. In such variations, the testing and operation of the propulsion system, the steering system, the braking system, and the suspension system can be verified via a wired tethered connection. In addition, the method can include testing the propulsion system, the steering system, the braking system, and the suspension system after integrating the onboard controller such that control of the propulsion system, the steering system, the braking system, and the suspension system dependent of the onboard controller is verified. And in at least one variation the onboard controller transmits transient data to an offboard controller and the transient data is at least one of performance data of the MVS, at least one trouble code of the MVS, assembly testing data of the MVS, and over-the-air programming information of the MVS. The performance data of the MVS includes performance data of at least one component of the propulsion system, at least one component of the steering system, at least one component of the braking system, and at least one component of the suspension system, and the onboard controller wirelessly transmits the transient data to the offboard controller.

In some variations, the method includes assigning and storing a vehicle identification number (VIN) for the MVS in the onboard controller.

In at least one variation the method includes a central control station directing the MVS to a subsequent assembly station and the MVS moves to the subsequent assembly station untethered.

In some variations, the method includes a central control station directing the MVS through a plurality of subsequent assembly stations as a function of the VIN assigned to the MVS, and the MVS moves through the plurality of subsequent assembly stations untethered.

In at least one variation the method includes assembly a battery cooling system onto the vehicle frame.

In some variations, the method includes testing the propulsion system, the steering system, the braking system, and the suspension system using a tethered connection and before integrating the onboard controller such that operation of the propulsion system, the steering system, the braking system, and the suspension system independent of the onboard controller is verified, and testing the propulsion system, the steering system, the braking system, and the suspension system after integrating the onboard controller such that control of the propulsion system, the steering system, the braking system, the suspension system, and the onboard controller are verified.

According to another form of the present disclosure, a method of manufacturing a MVS includes assembling a propulsion system onto a vehicle frame, assembling a suspension system onto the vehicle frame, assembling a steering system and braking system onto the vehicle frame, assembling an electrical distribution system onto the vehicle frame, testing and verifying the propulsion system, the steering system, the braking system, and the suspension system via a tethered connection, and integrating an onboard controller with the propulsion system, the steering system, and the braking system. The onboard controller is configured to command the propulsion system, the steering system, and the braking system such that the MVS is operable to move untethered through a top hat assembly line during assembly of a top hat on the MVS.

In some variations, the method includes testing the propulsion system, the steering system, the braking system, and the suspension system after integrating the onboard controller such that control of the propulsion system, the steering system, the braking system, the suspension system, and the onboard controller are verified.

In at least one variation, the method includes assigning and storing a vehicle identification number (VIN) for the MVS in the onboard controller and directing the MVS through a plurality of subsequent assembly stations untethered via wireless transmission of commands from a central control station to the onboard controller with the commands from the central control station to the onboard controller being a function of the VIN assigned to the MVS.

In still another form of the present disclosure, a method of manufacturing a MVS includes assembling a propulsion system onto a vehicle frame, assembling a suspension system onto the vehicle frame; assembling a steering system and braking system onto the vehicle frame, assembling an electrical distribution system onto the vehicle frame, testing and verifying the propulsion system, the steering system, the braking system, and the suspension system via a tether connection, removing the tether connection, integrating an onboard controller with the propulsion system, the steering system, and the braking system, and testing the propulsion system, the steering system, the braking system, and the suspension system such that control of the propulsion system, the steering system, the braking system, the suspension system, and the onboard controller are verified. Also, the onboard controller is configured to command the propulsion system, the steering system, and the braking system such that the MVS is operable to move untethered through a top hat assembly line during assembly of a top hat on the MVS.

In some variations, the onboard controller transmits transient data to an offboard controller, the transient data being at least one of a trouble code of the MVS, assembly testing data of the MVS, and performance data of the MVS, the performance data being at least one component of the propulsion system, at least one component of the steering system, at least one component of the braking system, and at least one component of the suspension system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
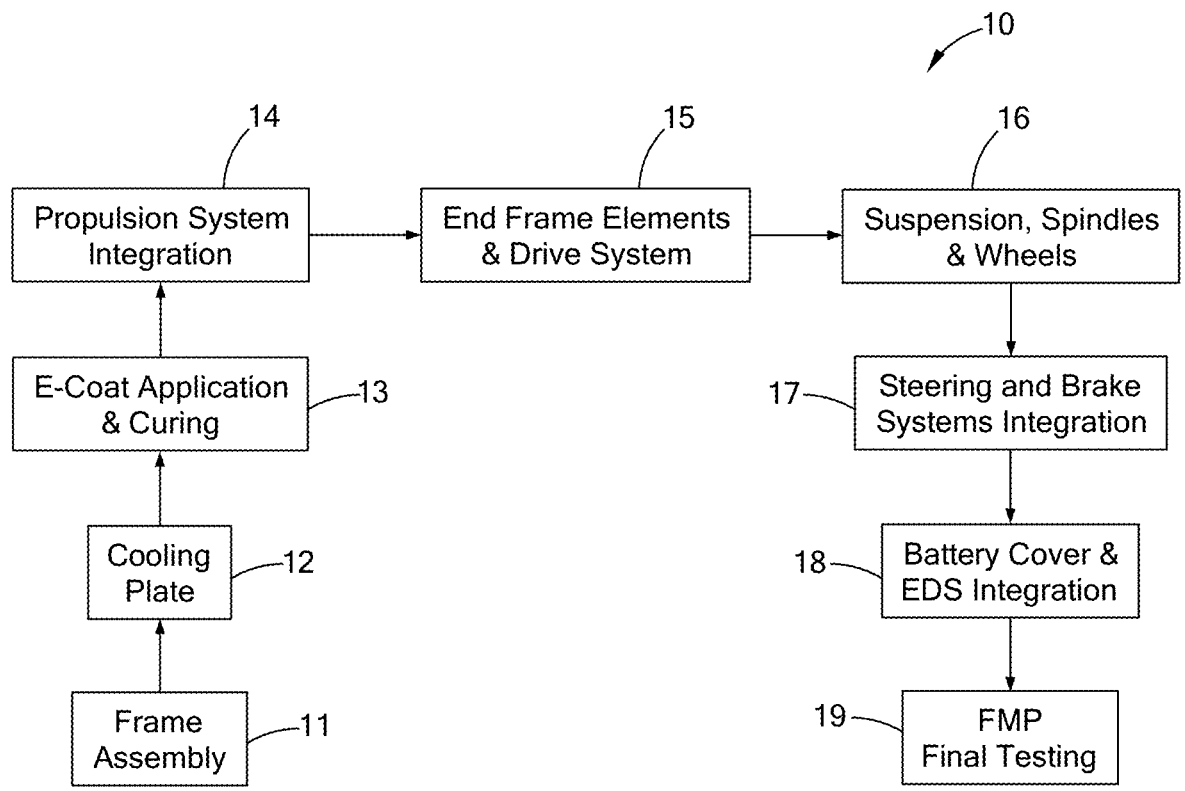
FIG. 1 is flow chart for a method of manufacturing a modular vehicle subassembly according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2A:
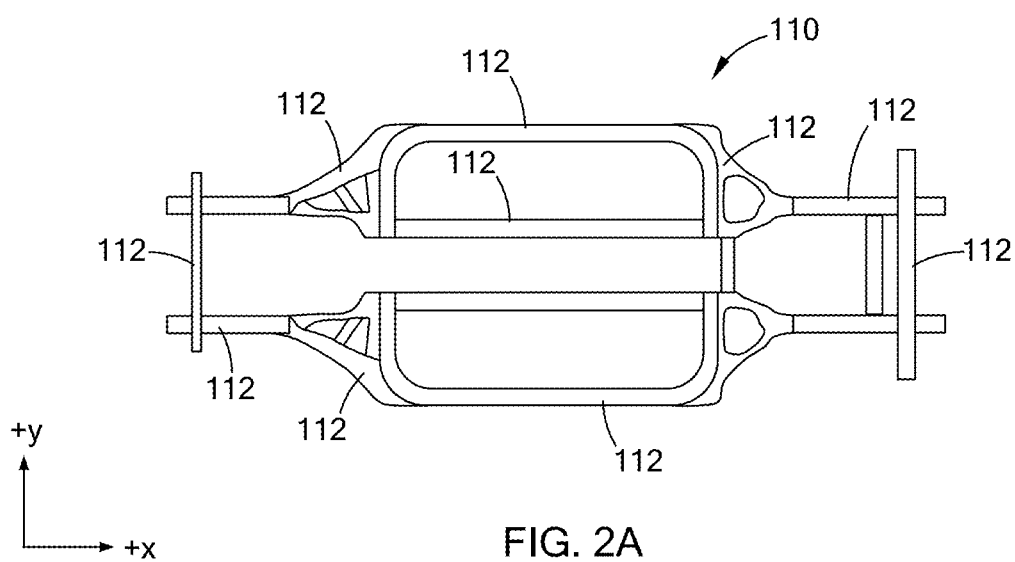
FIG. 2A shows a frame assembled from a plurality of frame components according to the teachings of the present disclosure.
Figure 2B:
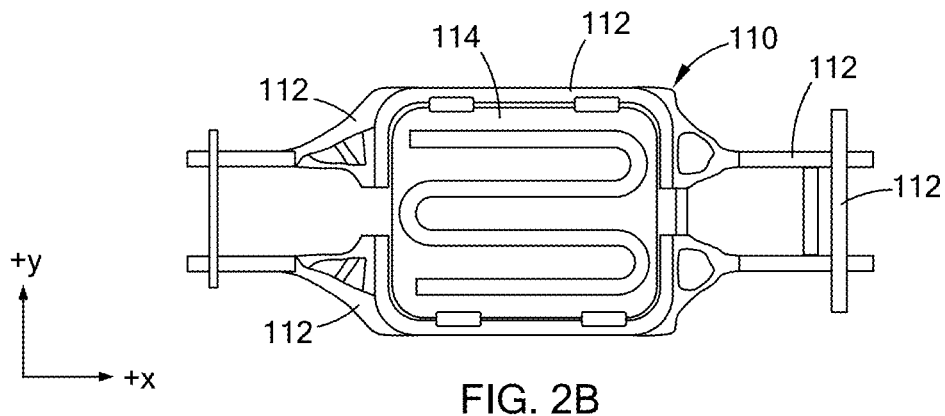
FIG. 2B shows a cooling plate assembled onto the frame shown in FIG. 2A according to the teachings of the present disclosure.

Referring to FIGS. 1 and 2A-2F, a method 10 of manufacturing a modular vehicle subassembly (MVS) 100 (FIG. 3) is shown in FIG. 1 and various stages of assembly of the MVS 100 is shown in FIGS. 2A-2F. With reference to FIGS. 1 and 2A-2B, the method 10 includes assembling a plurality of frame components 112 to form a frame 110 (FIG. 2A) at 11, and in some variations a cooling plate 114 (FIG. 2B) is assembled onto the frame 110 at 12. In some variations the plurality of frames components 112 are welded together to form the frame 110 and the cooling plate 114 is welded to the frame 110. In other variations one or more of the frame components 112 and/or cooling plate 114 are joined together with fasteners such as bolts, screws, and rivets, among others. A protective coating, e.g., an E-coating, is applied to and cured on the frame 110 and cooling plate 114 (if included) at 13.

Figure 2C:
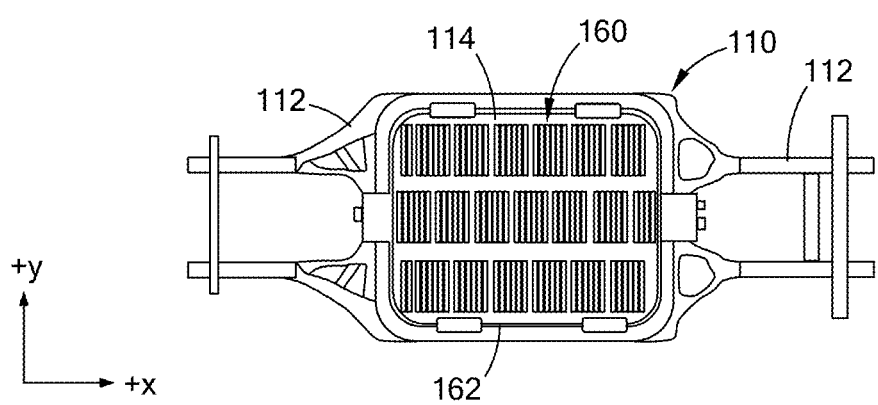
FIG. 2C shows a propulsion system installed and integrated with the frame shown in FIG. 2A according to the teachings of the present disclosure.
Figure 2D:
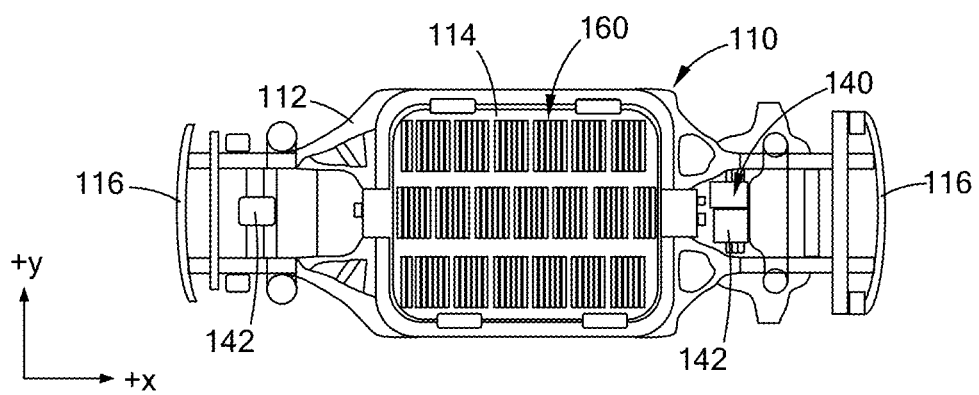
FIG. 2D shows end frame components and a drive system assembled onto the frame shown in FIG. 2A according to the teachings of the present disclosure.
Figure 2E:
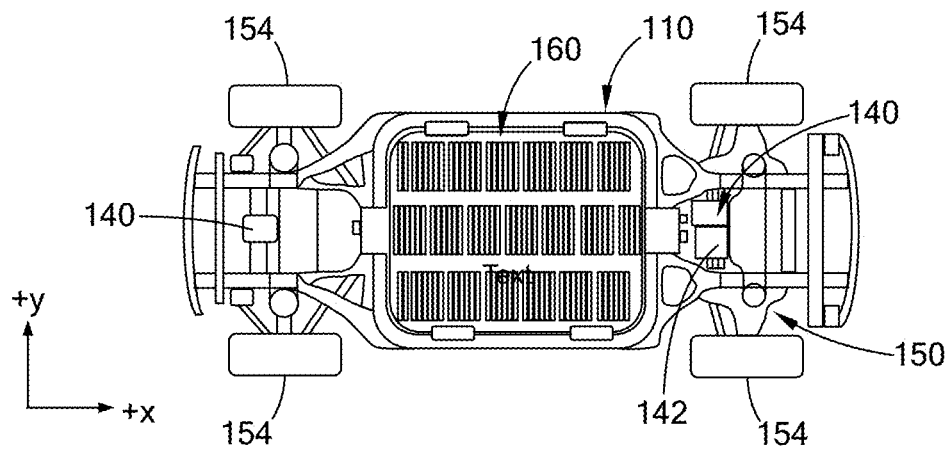
FIG. 2E shows a suspension system assembled onto the frame shown in FIG. 2A according to the teachings of the present disclosure.
Figure 2F:
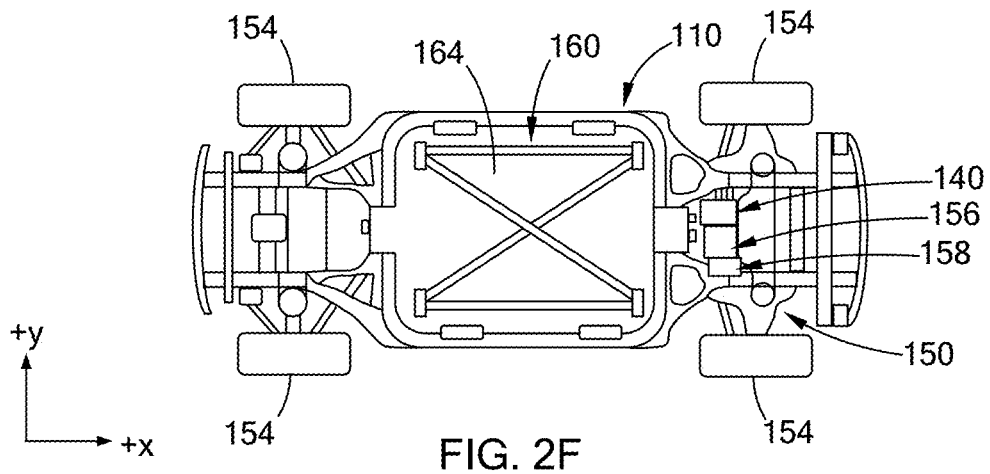
FIG. 2F shows a battery cover and an electrical distribution system installed and integrated the frame and other components shown in FIGS. 2A-2E according to the teachings of the present disclosure.

Referring to FIGS. 1 and 2C, a propulsion system 160 is installed and integrated with the frame 110 at 14. In some variations the propulsion system 160 is a battery propulsion system with a plurality of electric batteries 162. End frame elements 116 and a drive system 140 (FIG. 2D) are assembled onto the frame 110 at 15. And in at least one variation the end frame elements 116 include bumper supports and the drive system 140 includes one or more electric motors 142 integrated with the propulsion system 160.

A suspension system 150 including shock absorbers (not labeled), spindles (not labeled), and wheels 154 (with tires, FIG. 2E) are assembled onto the frame 110 at 16 and a steering system 156 and a braking system 158 (FIG. 2E) are installed and integrated with the suspension system 150 at 17. In some variations the braking system 158 is an integrated braking system with the drive system 140 and/or electric motors 142. In the alternative, or in addition to, the braking system 158 is a traditional disc type braking system coupled to the wheels 154. A battery cover 164 (FIG. 2F) and an electrical distribution system (EDS) (not labeled) are installed and integrated with the above mentioned components at 18 such that assembly of the MVS 100 is provided. The MVS 100 is subjected to MVS final testing at 19 as described in greater detail below.

Figure 3:
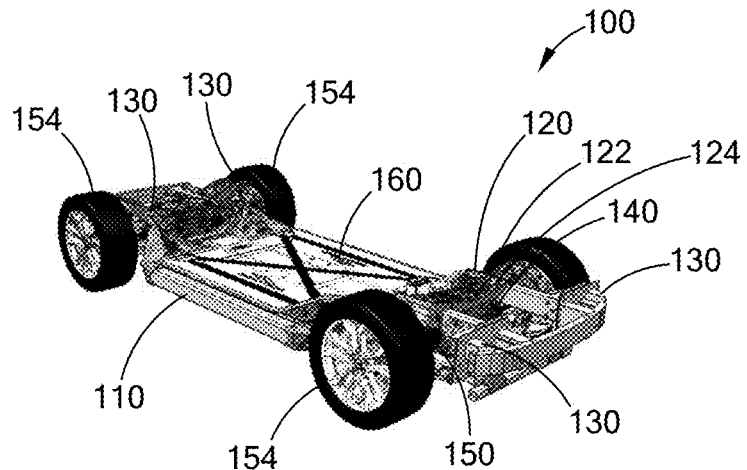
FIG. 3 is a perspective view of an assembled modular vehicle subassembly according to the teachings of the present disclosure.

Referring to FIG. 3, in some variations the method 10 includes installing an onboard controller 120 and one or more transient sensors 130 (e.g., installed at 18) integrated with the onboard controller 120. In at least one variation the onboard controller 120 is a stand along unit, while in other variations the onboard controller is integrated within a computer cluster 124 of the MVS 100. As used herein, the phrase "stand alone unit" refers to a physically separate unit or controller. In at least one variation the onboard controller 120 includes an onboard communications link 122. As used herein, the phrase "communication link" refers to a communication channel that connects two or more devices for the purpose of data transmission. In at least one variation the onboard communications link 122 is a wireless communications link with a wireless signal receiver/transmitter that includes an antenna.

Figure 4:
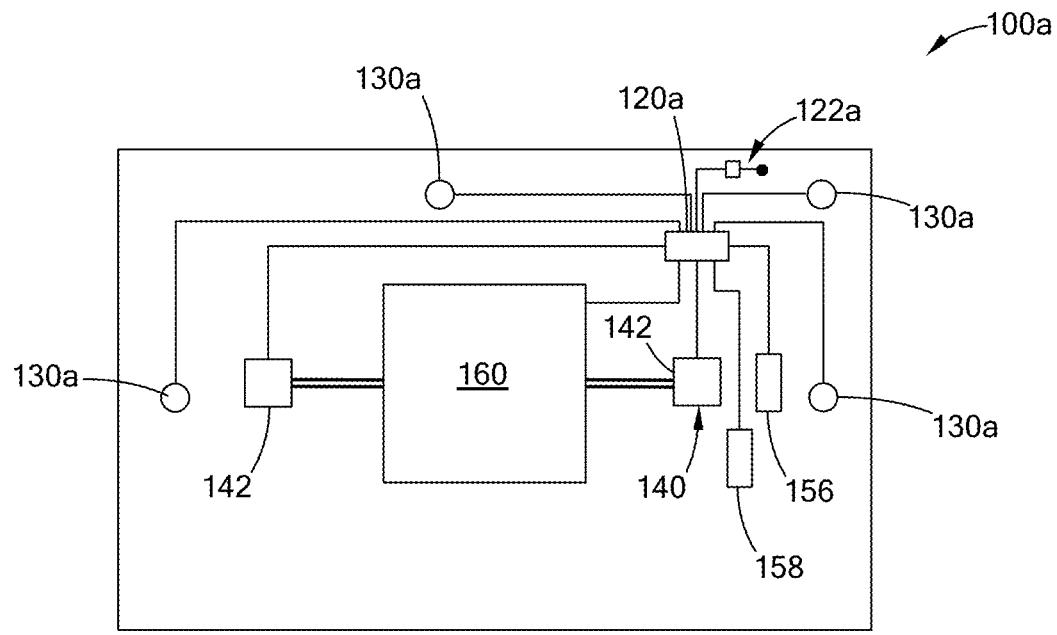
FIG. 4 is a block diagram of a remote controlled modular vehicle subassembly according to the teachings of the present disclosure.

In one form of the present disclosure, the MVS 100 is configured for remote control movement. As used herein, the phrase "remote control" refers to movement of a MVS 100 via commands, direction and/or instruction from a controller not on the MVS 100 (i.e., an external controller). For example, and with reference to FIG. 4, an example functional block diagram of a remote controlled MVS 100a is shown. The MVS 100a includes an onboard controller 120a, an onboard communications link 122, transient data sensors 130a, the drive system 140, the suspension system 150, the steering system 156, the braking system 158, and the propulsion system 160. Also, the onboard controller 120a is in communication with the onboard communications link 122a, transient data sensors 130a, drive system 140, suspension system 150, steering system 156, braking system 158, and propulsion system 160.

The onboard communications link 122a and the transient data sensors 130a are configured to transmit at least one of signals, data, and commands (referred to herein simply as "information") to the onboard controller 120a and the onboard controller 120a is configured to receive the information from the onboard communications link 122a and the transient data sensors 130a. In some variations, the onboard controller 120a is configured to transmit additional information in response to or as a function of the information received from the onboard communications link 122a and/or transient data sensors 130a. In at least one variation the onboard controller 120 transmit additional information to at least one of the drive system 140, suspension system 150, steering system 156, braking system 158, and propulsion system 160. In the alternative, or in addition to, the onboard controller 120 transmit additional information to an external controller, e.g., a zone controller of an assembly line as discussed in greater detail below.

The transient data sensors 130a of the MVS 100a can be proximity sensors, visual sensors, fluid level sensors, energy level sensors, electrical connection sensors, among others, that provide transient data to the onboard controller 120a and/or to zone controllers discussed below. Non-limiting examples of transient data provided by the transient data sensors 130a include data on or related to MVS 100a location, MVS 100a position, MVS 100a movement, obstacle detection along a path the MVS 100a is moving along, general environmental conditions around the MVS 100a, fluid level in a container assembled onto the MVS 100a, charge level of an electric battery of the MVS 100a, resistance of a connection between two electrical components assembled onto the MVS 100a, operation of a component assemble onto the MVS 100a, and over-the-air (OTA) programming information on the MVS 100a, among others. Accordingly, the transient data sensors 130a provide notification on how a given MVS 100a is performing operational activities such as alignment on an assembly path, tracking along the assembly path, and obstacle avoidance on the assembly path as the MVS 100a moves within a vehicle assembly facility. In addition, the transient data sensors 130a provide assembly information additional components assembled onto the MVS 100a as the MVS 100a moves through one or more assembly zones.

The onboard controller 120a is configured to direct the propulsion system 160 to provide power to the drive system 140 and direct the drive system 140 to drive at least one of the wheels 154 such that the MVS 100a moves across a surface (e.g., a floor or road). As used herein, the term 'drive' refers to rotating an object (e.g., a wheel) by applying a force causing the object to rotate. Accordingly, the propulsion system 160 is configured to provide power to the drive system 140 and the drive system 140 is configured to rotate the wheels 154.

In some variations, and as noted above, the propulsion system 160 is an electric propulsion system with one or more electric batteries 162 that provide electric power to the drive system 140. In other variations, the propulsion system 160 is a hybrid propulsion system with one or more electric batteries 162 and an internal combustion engine (not shown) that provides a combination of electric power and mechanical power (converted from chemical energy) to the drive system 140. In at least one variation the MVS 100a includes a hybrid propulsion system that uses electric power to move through one or more assembly zones as described in greater detail below.

The onboard controller 120a is also configured to direct the steering system 156 to steer at least one of the wheels 154 (e.g., the front two wheels 154) such that the MVS 100a follows or moves along a desired pathway. As used herein, the term "steer" or "steering" refers to guiding or controlling directional movement of a vehicle by turning at least one wheel of the vehicle. Accordingly, the steering system 156 is configured to change a course or direction of the MVS 100a. As used herein the phrase "course of direction" refers to a direction or path along which the MVS 100a is moving.

In at least one variation the onboard controller 120a is configured to direct the braking system 158 to apply a braking force such that the wheels 154 are inhibited from turning or rotating. And in some variations the onboard controller 120a is configured to direct the braking system 158 to apply an emergency braking force such that the MVS 100a stops moving, e.g., when an obstacle is detected approaching a predefined pathway the MVS 100a is moving along. Accordingly, it should be understood that the MVS 100*a* is configured to move along a predefined pathway and through one or more assembly lines of a vehicle assembly facility (e.g., a top hat assembly facility) using power from the propulsion system 160.

Figure 5:
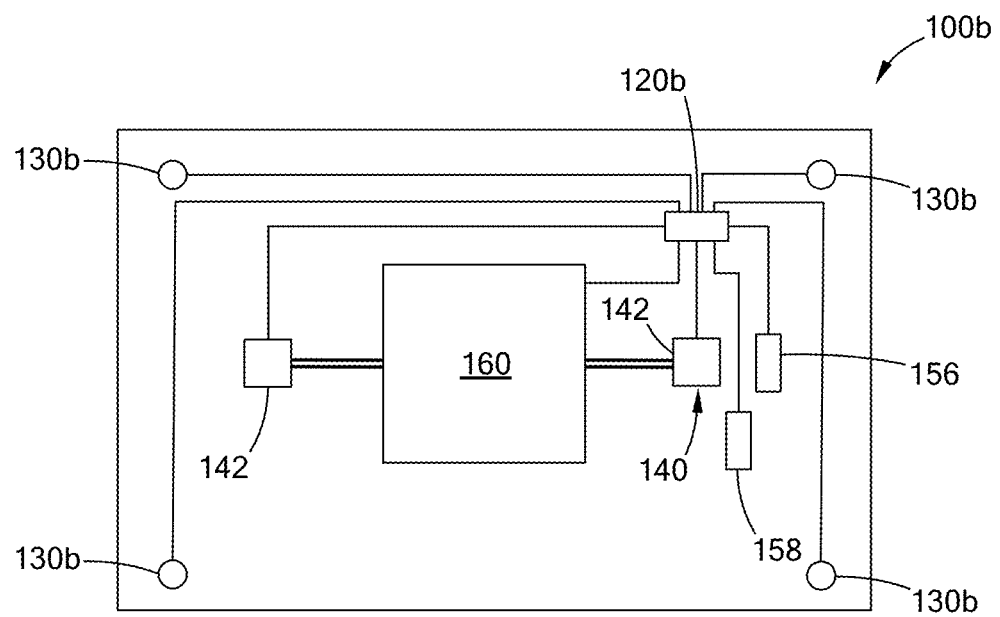
FIG. 5 is a block diagram of an autonomous modular vehicle subassembly according to the teachings of the present disclosure.

In another form of the present disclosure, the MVS 100 is configured for autonomous movement. As used herein the term "autonomous movement" refers to movement of a MVS that is controlled or direct by an onboard controller of the MVS absent controls or commands from an external or offboard controller. For example, and with reference to FIG. 5, a functional block diagram of a MVS 100*b* configured for autonomous movement is shown. The MVS 100*b* includes an onboard controller 120*b*, transient data sensors 130*b*, the drive system 140, the suspension system 150, the steering system 156, the braking system 158, and the propulsion system 160. The onboard controller 120*b* is in communication with the transient data sensors 130*b*, drive system 140, suspension system 150, steering system 156, braking system 158, and propulsion system 160. In some variations the MVS 100*b* includes an onboard communications link (not shown).

The transient data sensors 130*b* are configured to transmit information to the onboard controller 120*b* and the onboard controller 120*b* is configured to receive the information. In some variations, the onboard controller 120*b* is configured to transmit additional information in response to or as a function of the information received from the transient data sensors 130*b*. The transient data sensors 130*b* include at least one of visual sensors and proximity sensors configured to detect at least one of an assembly path, markers, and beacons, and transmit visual and/or proximity data on the assembly path, markers and/or beacons to the onboard controller 120*b*. And the onboard controller 120*b* is configured to receive the visual and/or proximity data and direct the propulsion system 160, braking system 158, steering system 156 and drive system 140 such that the MVS 100*b* autonomously moves along an assembly path and through one or more assembly lines of a vehicle assembly facility (e.g., a top hat assembly facility).

Figure 6:
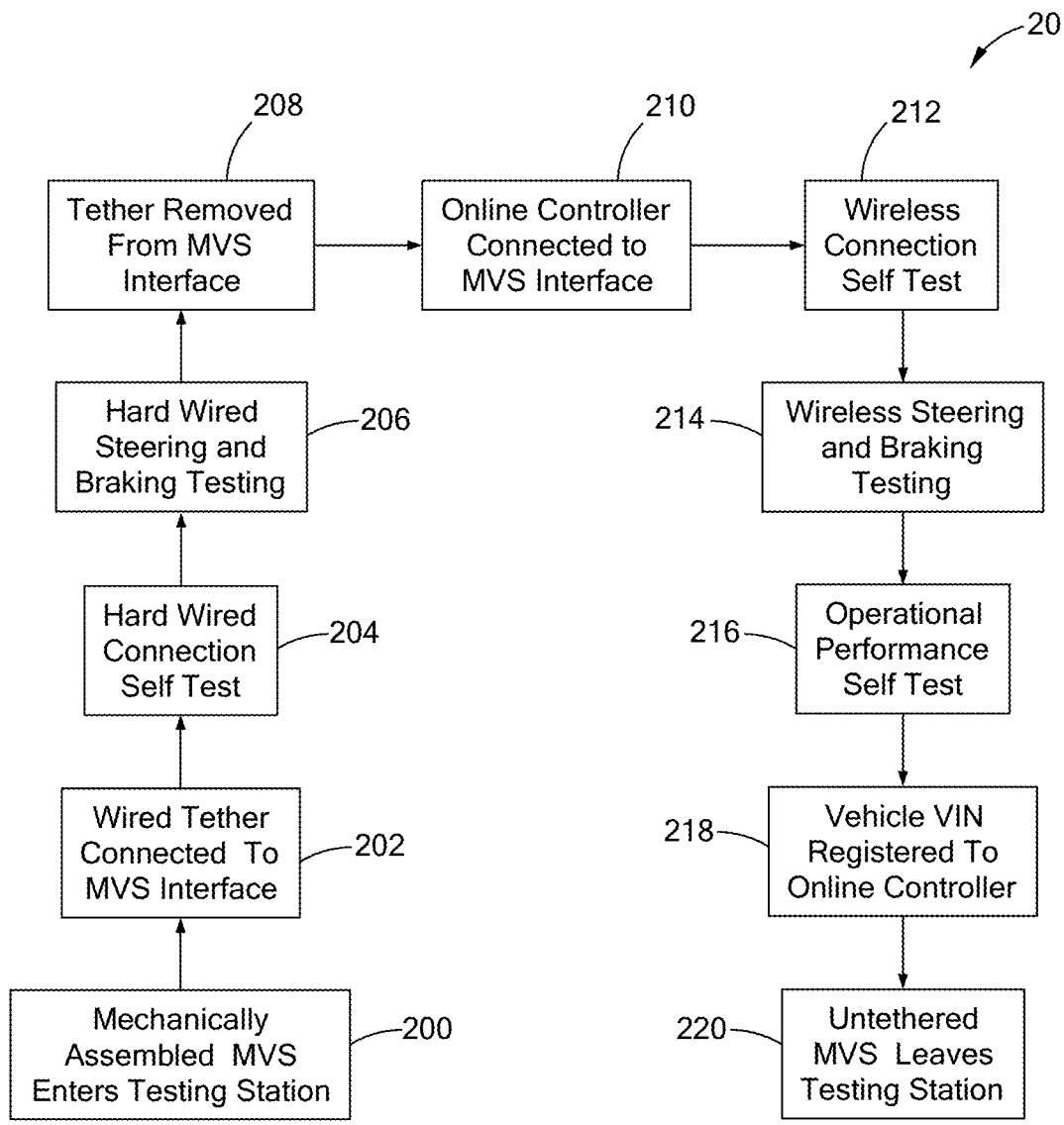
FIG. 6 is a flow chart for a method of testing a modular vehicle subassembly according to the teachings of the present disclosure.

Referring to FIG. 6, a method 20 of testing a MVS 100 in accordance with step 19 of method 10 (FIG. 1) is shown. The method 20 includes the MVS 100 entering a testing station at 200. In some variations the testing station is the same location as where the battery cover and EDS integration occurs during assembly of the MVS 100, while in other variations the testing station is at a separate location such that the MVS 100 is transported or moved from a battery cover and EDS integration station to the testing station. A wired tether is connected to an electrical interface of the MVS at 202 and a self-test of the wired tether connection (also referred to herein as a "hard wired" connection or simply as "hard wired") is performed at 204. In some variations, the electrical interface is an interface or connection that bypasses the onboard controller 120. After the self-test of the wired tether connection is performed at 204, the method 20 performs hard wired testing of the drive system 140, suspension system 150, steering system 156, braking system 158, and/or propulsion system 160 at 206 such that operation of the drive system 140, suspension system 150, steering system 156, braking system 158, and/or propulsion system 160 independent of the onboard controller 120 is performed and verified.

The wired tether is removed or unconnected from the MVS interface at 208 and an online (external) controller is connected to the MVS interface at 210. A wireless connection self-test of or between the online controller and the MVS interface is performed at 212 and in some variations the online controller directs testing of the drive system 140, suspension system 150, steering system 156, braking system 158, and/or propulsion system 160 at 214. In some variations the online controller directs the onboard controller 120 and the onboard controller 120 directs testing of the drive system 140, suspension system 150, steering system 156, braking system 158, and/or propulsion system 160 at 214 such that operation of the drive system 140, suspension system 150, steering system 156, braking system 158, and/or propulsion system 160 dependent of the onboard controller 120 is verified. Operational performance testing is performed at 216, a vehicle identification number (VIN) is assigned to the MVS 100 and registered with the online controller at 218, and the untethered MVS 100 leaves the testing station at 220. In some variations, the MVS 100 leaves the testing station under its own power via remote control or autonomous control.

After leaving the testing station, the MVS 100 is available for additional assembly operations, e.g., for assembly of a top hat thereon. For example, and with reference to FIG. 7, at least one variation of remote control movement of the MVS 100*a* through a plurality of assembly zones 310, 320 is described. Particularly, a system 30 for remote control of the MVS 100*a* includes a central management system 170 with a plurality of stored predetermined paths 172 and specifications 174 for the MVS 100*a*. That is, the central management system 170 is configured to direct the MVS 100*a* to move along a predetermined assembly path 'AP' (also referred to herein simply as "assembly path AP") within a vehicle assembly facility via remote control.

The system 30 also includes a zone management system 180 with a plurality of zone controllers 181, 182 for the plurality of assembly zones 310, 320, respectively. The plurality of zone controllers 181, 182 are in communication with the central management system 170 and in communication with the onboard controller 120 of the MVS 100*a*. That is, as the MVS 100*a* moves through assembly zone 310 shown in FIG. 7, the zone controller 181 is in communication with the onboard controller 120*a* via the onboard communication link 122*a* and a zone controller communication link 181*b*, and as the MVS 100*a* moves through zone 320 the zone controller 183 is in communication with the onboard controller 120*a* via the onboard communication link 122*a* and a zone controller communication link 182*b*.

Figure 7:
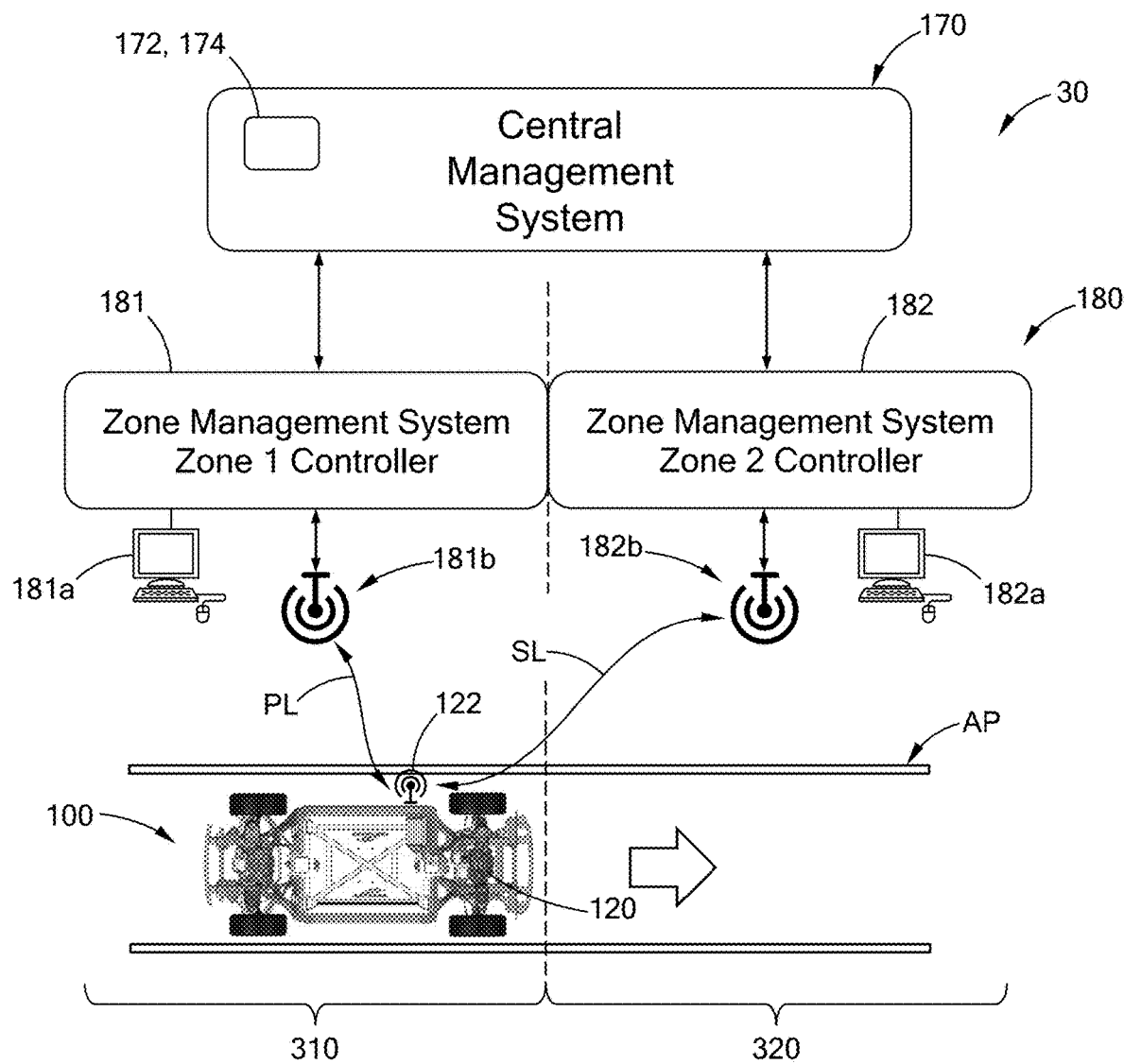
FIG. 7 shows a modular vehicle subassembly according to the teachings of the present disclosure moving through of a plurality of top hat assembly zones.

In some variations the zone controller communication links 181*b*, 182*b* are wireless communication links 181*b*, 182*b*. Also, and as shown in FIG. 7, in some variations the plurality of communication links include a primary link 'PL' and a secondary link 'SL'. In at least one variation, the primary link is between an MVS 100 and an active zone controller (e.g., a zone controller for a zone where an MVS is presently located) and the secondary link 'SL' is between an MVS 100 and an adjacent zone controller (e.g., a zone controller for a zone where the MVS will enter).

In at least one variation, the plurality of zone controllers 181, 182, and other zone controllers disclosed herein, have a manual interface system 181*a*, 182*a*, (e.g., a desktop or laptop computer) configured for entering and/or retrieving data from the plurality of zone controllers 181, 182. In at least one variation, one or more of the manual interface systems 181*a*, 182*a* is configured to provide data and/or notification to the central management system 170 regarding conditions of the assembly path AP. Non-limiting examples of such conditions include material shortages, operational problems, emergency problems within the vehicle assembly facility, among others.

The one or more of the zone controller communications link 181b, 182b are configured to receive and/or transmit data from and/or to the onboard controllers 120a of MVSs 100a such that movement of MVSs 100a throughout the plurality of zones within the vehicle assembly facility is managed and controlled. For example, in some variations the plurality of zone controllers 181, 182 are configured to receive transient data from the onboard controllers 120a of the MVSs 100a and manage movement of the MVSs 100 throughout a plurality of zones within a vehicle assembly facility. Non-limiting examples of the transient data include positions of the MVSs 100a, status of systems of the MVSs 100a, current assembly state of the MVSs 100a, proper positioning of parts on the MVSs 100a, among others. And non-limiting example of the status of systems of the MVSs 100a, battery charge level of the MVSs 100a, tire pressure of the tires of the MVSs 100a, fluid levels of the MVSs 100a, fluid pressures in the MVSs 100a, among others.

It should be understood that the MVS 100a is directed along the assembly path AP by the central management system 170 and/or zone controllers 181, 182. Stated differently, the MVS 100a moves along the assembly path AP and through the assembly zones 310, 320 via remote control. For example, the onboard controller 120b receives transient data from one or more of the transient data sensors 130a and transmits onboard data to the onboard communications link 122a. As used herein, the phrase "onboard data" refers to data obtained or derived from the transient data sensors 130a. The onboard communications link 122a receives the onboard data from the onboard controller 120a and transmits the onboard data to an external controller (e.g., zone controller 181 and/or central management system, 170). In response to receiving the onboard data, the external controller transmits and the onboard communications link 122a receives offboard data and transmits the offboard data to the onboard controller 120a. As used herein the phrase "offboard data" refers to data transmitted to an onboard communications link from an external controller and non-limiting examples of offboard data include steering instructions, braking instructions, propulsion instructions, among others. And the onboard controller 120a receives the offboard data and directs the drive system 140, steering system 156, braking system 158, and/or propulsion system 160 such that the MVS 100a desirably moves along the assembly path AP through the plurality of assembly zones 310, 320.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a modular vehicle subassembly (MVS), the method comprising:
    assembling a propulsion system and drive system onto a vehicle frame;
    assembling a suspension system and wheels onto the vehicle frame;
    assembling a steering system and a braking system onto the vehicle frame;
    assembling an electrical distribution system onto the vehicle frame;
    testing and verifying at least one of the drive system, the suspension system, the steering system, the braking system, and the propulsion system;
    integrating an onboard controller with the propulsion system, the steering system, and the braking system, wherein the onboard controller is configured to command the propulsion system, the steering system, and the braking system such the MVS is operable to move untethered through a top hat assembly line during assembly of a top hat on the MVS; and
    assigning and storing a vehicle identification number (VIN) for the MVS in the onboard controller, wherein a central control station directs the MVS through a plurality of subsequent assembly stations as a function of the VIN assigned to the MVS.

2. The method according to claim 1, wherein the onboard controller is a stand-alone unit with an onboard communications link.

3. The method according to claim 1, wherein the onboard controller is integrated within a computer cluster of the MVS.

4. The method according to claim 3 further comprising assembling an onboard communications link in communication with the onboard controller.

5. The method according to claim 1, wherein the at least one of the drive system, the suspension system, the steering system, the braking system and the propulsion system are tested before integrating the onboard controller.

6. The method according to claim 5, wherein the testing and operation of the propulsion system, the steering system, the braking system, and the suspension system are verified via a wired tethered connection.

7. The method according to claim 5 further comprising testing the propulsion system, the steering system, the braking system, and the suspension system after integrating the onboard controller such that control of the propulsion system, the steering system, the braking system, and the suspension system dependent of the onboard controller is verified.

8. The method according to claim 7, wherein the onboard controller transmits transient data to an offboard controller, wherein the transient data are at least one of performance data of the MVS, at least one trouble code of the MVS, assembly testing data of the MVS, and over-the-air (OTA) programming information of the MVS.

9. The method according to claim 8, wherein the performance data of the MVS comprise performance data of at least one component of the propulsion system, at least one component of the steering system, at least one component of the braking system, and at least one component of the suspension system.

10. The method according to claim 8, wherein the onboard controller wirelessly transmits the transient data to the offboard controller.

11. The method according to claim 1 further comprising registering the VIN with the onboard controller.

12. The method according to claim 11 further comprising the central control station directing the MVS to a subsequent assembly station, wherein the MVS moves to the subsequent assembly station untethered.

13. The method according to claim 1, wherein directions from the central control station are a function of the VIN assigned to the MVS.

14. The method according to claim 1 further comprising assembling a battery cooling system onto the vehicle frame.

15. The method according to claim 1 further comprising:
testing the propulsion system, the steering system, the braking system, and the suspension system using a tethered connection and before integrating the onboard controller such that operation of the propulsion system, the steering system, the braking system, and the suspension system independent of the onboard controller is verified; and
testing the propulsion system, the steering system, the braking system, and the suspension system after integrating the onboard controller such that control of the propulsion system, the steering system, the braking system, the suspension system, and the onboard controller is verified.

16. A method of manufacturing a modular vehicle subassembly (MVS), the method comprising:
assembling a propulsion system and a drive system onto a vehicle frame;
assembling a suspension system and wheels onto the vehicle frame;
assembling a steering system and a braking system onto the vehicle frame;
assembling an electrical distribution system onto the vehicle frame;
integrating an onboard controller with the propulsion system, the steering system, and the braking system, wherein the onboard controller is configured to command the propulsion system, the steering system, and the braking system such that the MVS is operable to move untethered through a top hat assembly line during assembly of a top hat on the MVS;
testing the propulsion system, the steering system, the braking system, and the suspension system via the onboard controller, such that control of the propulsion system, the steering system, the braking system, the suspension system, and the onboard controller is verified; and
directing the MVS through a plurality of assembly stations via wireless transmission of commands from a central control station to the onboard controller, wherein the commands from the central control station are a function of a vehicle identification number (VIN) associated with the MVS.

17. The method according to claim 16 further comprising testing and verifying the propulsion system, the steering system, the braking system, and the suspension system via a tethered connection.

18. The method according to claim 17 further comprising:
assigning and storing the VIN for the MVS in the onboard controller.

19. A method of manufacturing a modular vehicle subassembly (MVS), the method comprising:
assembling a propulsion system onto a vehicle frame;
assembling a suspension system and wheels onto the vehicle frame;
assembling a steering system and a braking system onto the vehicle frame;
assembling an electrical distribution system onto the vehicle frame;
testing and verifying the propulsion system, the steering system, the braking system, and the suspension system via a tether connection;
removing the tether connection;
integrating an onboard controller with the propulsion system, the steering system, and the braking system; and
testing the propulsion system, the steering system, the braking system, and the suspension system such that control of the propulsion system, the steering system, the braking system, the suspension system, and the onboard controller are verified, wherein the onboard controller is configured to command the propulsion system, the steering system, and the braking system such that the MVS is operable to move untethered through a top hat assembly line during assembly of a top hat on the MVS.

20. The method according to claim 19, wherein the onboard controller transmits transient data to an offboard controller, the transient data being at least one of a trouble code of the MVS, assembly testing data of the MVS, and performance data of the MVS, the performance data being of at least one component of the propulsion system, at least one component of the steering system, at least one component of the braking system, and at least one component of the suspension system.

* * * * *